3,539,642
2-PHENYL-2-(1-NAPHTHYL)ACETAMIDES
Enos C. Pesterfield, Briarcliff Manor, N.Y., assignor to Geigy Chemical Corporation, Ardsley, N.Y., a corporation of New York
No Drawing. Filed July 19, 1967, Ser. No. 654,365
Int. Cl. C07c 103/30
U.S. Cl. 260—559                                      24 Claims

ABSTRACT OF THE DISCLOSURE

Certain 2 - phenyl - 2-(1-naphthyl)acetamides, having cardiovascular properties and being useful chemical intermediates are prepared through treatment of a 1-phenyl-2-oxo - 1,2-dihydronaptho[2,1 - b]furan or a 2-phenyl-2-(2-alkoxy-1-naphthyl)acetyl chloride with ammonia or a primary or secondary amine. A typical embodiment is N-t-butyl 2-phenyl-2-(2-hydroxy-1-naphthyl)acetamide.

DETAILED DESCRIPTION

This invention relates to novel organic compounds having pharmacological properties and being useful as chemical intermediates. In particular, the present invention pertains to compounds of the formula:

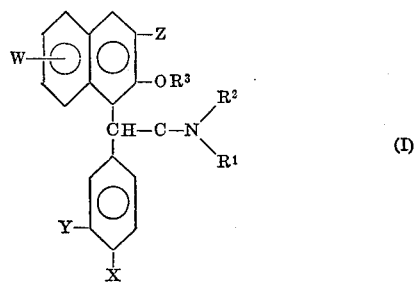

wherein each of X and Y is hydrogen, hydroxy, methoxy, chloro or fluoro;
W is hydrogen, chloro, fluoro, bromo or hydroxy;
Z is hydrogen or hydroxy;
$R^1$ is hydrogen or (lower)alkyl;
$R^2$ is hydrogen, (lower)alkyl, phenyl(lower)alkyl or hydroxyphenyl(lower)alkyl; and
$R^3$ is hydrogen or (lower)alkyl.

By the term (lower)alkyl is intended a monovalent, straight or branched chain hydrocarbon of up to 6 carbon atoms.

The foregoing compounds possess cardiovascular activity and in particular hypotensive and anti-hypertensive activity. They are accordingly useful in reducing the blood pressure of warm blooded animals, both in achieving hypotension and in counteracting hypertension. Administration, either alone or in combination with other agents is accomplished by the oral or parenteral routes in the usual pharmaceutical formulations such as tablets, capsules, suspensions and the like. In view of their low solubilities in water, aqueous solutions of a practical concentration are generally unsatisfactory. The dose of these compounds must in every case be individualized in view of the species, age, weight and the particular condition being treated, but generally a significant response is observed in the range of from about 3 to about 50 mg./kg. intravenously and from about 5 to about 100 mg./kg. orally.

The compounds of the present invention are incorporated in compositions suitable for oral administration to animals in solid and liquid unit dosage forms, such as tablets, capsules, powders, granules, syrups, suspensions and the like. The term unit dosage form as used in this specification and claims refers to physically discrete units suitable as unitary dosages for animals, each unit containing a predetermined quantity of active material calculated to produce the desired therapeutic effect in association with the required pharmaceutical diluent, carrier or vehicle.

Powders are prepared by comminuting a compound of this invention to a suitably fine size and mixing with a similarly comminuted diluent. The diluent can be an edible carbohydrate material such as starch. A sweetening agent or sugar may also be present as well as flavoring oil.

Capsules are made by preparing a powder mixture as described above and filling formed gelatin sheaths. As an adjuvant to the filling operation, a lubricant such as talc, magnesium stearate and calcium stearate may be added to the powder mixture before the filling operation.

Tablets are made by preparing a powder mixture, granulating or slugging, adding a lubricant and pressing into tablets. The powder mixture is prepared by mixing the compound, suitably comminuted, with a diluent or base such as starch, sucrose, kaolin, dicalcium phosphate and the like. The powder mixture can be granulated by wetting with a binder such as syrup, starch paste or acacia mucilage and forcing through a screen. As an alternative to granulating, the powder mixture can be slugged, i.e., run through the tablet machine and the resulting imperfectly formed tablets broken into pieces (slugs). The slugs can be lubricated to prevent sticking to the tablet forming dies by means of the addition of stearic acid, a stearate salt, talc or mineral oil. The lubricating mixture is then compressed into tablets. A protective coating consisting of a sealing coat of shellac, a coating of sugar and methyl cellulose, and a polish coating of carnauba wax may be provided.

For parenteral administration, fluid unit dosage forms can be prepared by suspending a measured amount of the compound in a non-toxic suspending agent suitable for injection.

The cardiovascular properties of the compounds of the present invention can be readily observed in standard in vivo tests. Thus, solely by way of example N-t-butyl 2-phenyl - 2 - (2-hydroxy-1-naphthyl)acetamide demonstrates antihypertensive activity in the Goldblatt dog.

This same compound upon oral administration is also very active in decreasing blood pressure in the intact anesthetized cat. A similar hypotensive response is observed upon intravenous administration of N-isopropyl 2-(4-chlorophenyl-2-(2-hydroxy-1-naphthyl)acetamide to the cat.

In addition to their pharmacological properties, the compounds of the present invention are valuable chemical intermediates for the preparation of antiarrhythmic N-alkyl 2-phenyl-2-(1-naphthyl)ethylamines such as those whose structure, use and preparation are disclosed and claimed in the application of Ralph D. Tanz, Ser. No. 398,790, filed Sept. 23, 1964.

Use of compounds of the present invention as intermediates for the preparation of such compounds may thus be represented as follows:

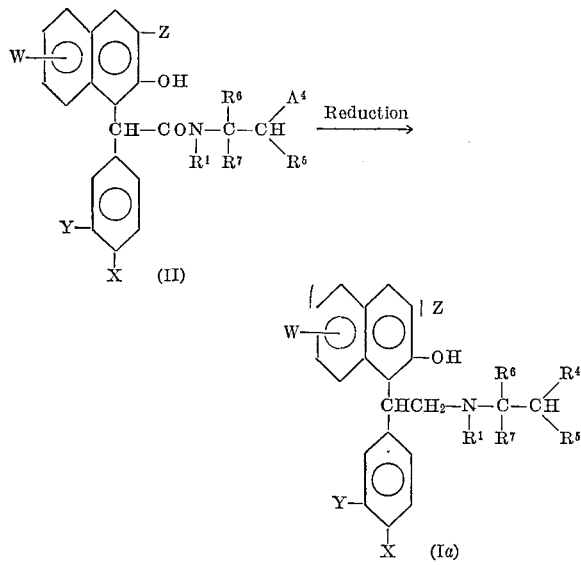

wherein X, Y, W, Z and $R^1$ are as previously defined, each of $R^4$, $R^6$ and $R^7$ is hydrogen, methyl or ethyl and $R^5$ is hydrogen, methyl, ethyl, phenyl or hydroxyphenyl. This reduction is accomplished through the use of borane, lithium aluminum hydride, dialkylaluminum hydrides such as diisobutyl aluminum hydride, or the like, generally in an inert solvent such as tetrahydrofuran, diethyl ether or the like.

The compounds of the present invention wherein $R^3$ is hydrogen are prepared through amination of a 1-phenyl-2-oxo-1,2-dihydronaphtho[2,1-b]furan with ammonia or a primary or secondary amine. This reaction may be represented as follows:

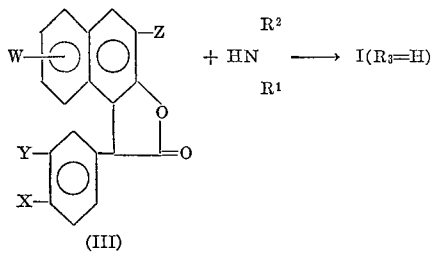

As this reaction is an equilibrium process, an excess of the amine is generally used to increase conversion of the lactone of Formula III. Thus while an inert solvent may be used, generally the amine itself is used in sufficient quantity to serve as the reaction solvent. In certain cases however such as with ammonia or solid amines, the use of a solvent such as ethanol is employed. The reaction may be conducted at room temperatures, or more, conveniently at reflux temperatures, and the product is then isolated upon completion of the reaction by removal of the excess amine, as through distillation or evaporation. Purification via conventional techniques such as recrystallization, chromatography or the like may then follow.

Compounds of Formula I wherein $R^3$ is (lower)alkyl are obtained by initial ring opening of the lactone of Formula III with concurrent alkylation. This may be accomplished for example through the action of an alkylating agent such as dialkylsulfate, for instance, dimethylsulfate, or an alkyl halide such as ethyl iodide, and base. The resulting 2-phenyl 2-(2-alkoxy-1-naphthyl)acetic acid is then converted to the corresponding acid chloride as with thionyl chloride, oxalyl chloride, phosphorous penta- chloride or the like, and this acid chloride is in turn treated with ammonia or an amine to yield the desired product. These reactions may be represented as follows:

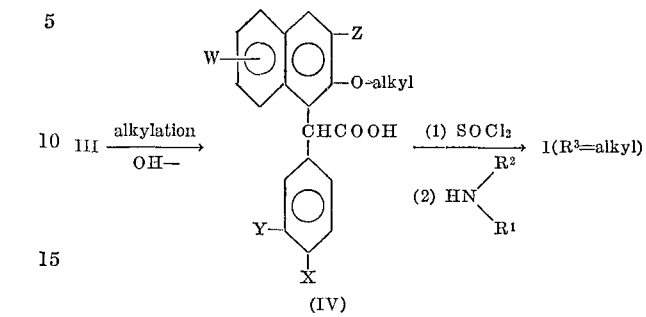

The requisite 1-phenyl-2-oxo-1,2-dihydronaphtho[2,1-b]furan of Formula III may be prepared by condensing a β-naphthol with mandelic acid, an alkyl mandelate or a substituted derivative of either. When a mandelate is utilized, an acid catalyst such as p-toluenesulfonic acid is advantageously employed. This condensation may be represented as follows:

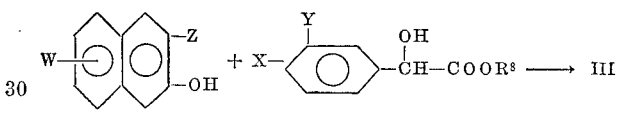

in which $R^8$ is hydrogen or alkyl.

The following examples will serve to further typify the nature of this invention but should not be construed as a limitation thereof.

EXAMPLE 1

N-isopropyl 2-(2-hydroxy-1-naphthyl)-2-(4-hydroxyphenyl)acetamide

A mixture of 25 g. of ethyl p-methoxymandelate, 34.3 g. of β-naphthol and 1.5 g. of p-toluene sulfonic acid is heated at 180° for 75 minutes and then at 200° for 45 minutes. The cooled mass is crushed under 25 ml. of ethanol and the insoluble portion is collected and washed with a little chilled ethanol. Recrystallization from dilute acetic acid yields 1-(p-methoxyphenyl)-2-oxo-1,2-dihydronaphtho[2,1-b]furan as white crystals, M.P. 146.5–147.5° C.

A mixture of 25.7 g. of 1-(p-methoxyphenyl)-2-oxo-1,2-dihydronaphtho[2,1-b]furan, 274 ml. of glacial acetic acid, and 103 ml. of 48% aqueous hydrogen bromide is refluxed for four hours. After storage at 0° for overnight, the pecipitate is collected and washed with a little dilute ethanol, to yield 1-(p-hydroxyphenyl)-2-oxo-1,2-dihydronaphtho[2,1-b]furan, as off-white crystals, M.P. 220–221° C.

A solution of 47.6 g. of 1-(p-hydroxyphenyl)-2-oxo-1,2-dihydronaphtho[2,1-b]furan in 350 ml. if isopropyl amine is refluxed for 2.75 hours. Excess amine is removed by distillation, the last traces under reduced pressure. The oily residue is dissolved in 1 liter of ethyl acetate and this solution is washed twice with 200 ml. portions of 3 N aqueous hydrochloric acid and then once with 200 ml. of water. The solution is dried over sodium sulfate and concentrated under reduced pressure. The oily residue is dissolved in benzene and upon standing, the solution deposits off-white crystals of N-isopropyl 2-(2-hydroxy-1-naphthyl)-2-(4-hydroxyphenyl)acetamide, M.P. 178° C. (dec.).

EXAMPLE 2

N-isopropyl 2-(4-chlorophenyl)-2-(2-hydroxy-1-naphthyl)acetamide

A solution of 1 g. of 1-(4-chlorophenyl)-2-oxo-1,2-dihydronaphtho[2,1-b]furan (prepared as described by C. O. Guss and R. W. Lerner, J. Am. Chem. Soc., 78, 1236 [1956]), in 13 ml. of isopropyl amine is refluxed for 1.5 hours, and then the excess amine is removed by distillation. A solution of the residue in ether is washed with dilute hydrochloric acid, then with water and dried over magnesium sulfate. The dried ethereal solution is concentrated under reduced pressure and the residual solid recrystallized from benzene/petroleum ether to yield N-isopropyl 2-(4-chlorophenyl)-2-(4 - chlorophenyl)-2-(2-hydroxy-1-naphthyl)acetamide as off-white crystals, M.P. 165° C. (dec.).

EXAMPLE 3

N-isopropyl 2-(3,4-dichlorophenyl)-2-(2-hydroxy-1-naphthyl)acetamide

A mixture of 25.0 g. of 3,4-dichloromandelic acid and 34.6 g. of β-naphthol is fused at 200° for 1.5 hours. Ethanol (30 ml.) is added to the cooled mass with good stirring. The insoluble material is collected by filtration and washed with a little ethanol. Recrystallization from acetic acid yields 1-(3,4-dichlorophenyl)-2-oxo-1,2-dihydronaphtho[2,1-b]furan as white needles, M.P. 154.5–155° C.

A solution of 10 g. of 1-(3,4-dichlorophenyl)-2-oxo-1,2-dihydronaphtho[2,1-b]furan (10.0 g.) in 50 ml. of isopropyl amine is refluxed for 2.5 hours. The excess amine is removed by distillation and the residue is recrystallized from ethyl acetate to yield N-isopropyl 2-(3,4-dichlorophenyl)-2-(2-hydroxy-1-naphthyl)acetamide as a white powder, M.P. 172.5° C. (dec.).

EXAMPLE 4

N-isopropyl (2-hydroxy-1-naphthyl)-2-(4-methoxyphenyl)acetamide

A solution of 20 g. of 1-(p-methoxyphenyl)-2-oxo-1,2-dihydronaphtho[2,1-b]furan in 150 ml. of isopropyl amine is heated at reflux for 1.5 hours. The excess amine is removed by distillation and the residue dissolved in ether. This solution is washed with 3 N aqueous hydrochloric acid, dried over magnesium sulfate, and concentrated under reduced pressure. The residual solid is recrystallized from benzene/petroleum ether to yield N-isopropyl 2-(2-hydroxy-1-naphthyl)-2-(4 - methoxyphenyl)acetamide as off-white crystals, M.P. 138° C. (dec.).

EXAMPLE 5

N-isopropyl 2-(3-chloro-4-hydroxyphenyl)-2(2-hydroxy-1-naphthyl)acetamide

Chlorine is passed into a solution of 100 g. of p-methoxyacetophenone in 360 ml. of glacial acetic acid at such a rate that the temperature is maintained at about 60°. The chlorination may be assumed complete when the temperature begins to fall. The cooled yellow solution is poured onto ice with good stirring and then allowed to stand for overnight. The separated solid is collected and is recrystallized from ethanol to yield 4'-methoxy-2,2,3'-trichloroacetophenone white crystals, M.P. 101.5–103° C.

4'-methoxy-2,2,3'-trichloroacetophenone (100 g.) is added over a two hour period to a solution of 61 g. of sodium hydroxide in 550 ml. of water at 60°. When all of the solid is dissolved, the reaction mixture is cooled and rendered acidic by the addition of 67 ml. of concentrated hydrochloric acid. The precipitated solid is collected and recrystallized from a large volume of toluene to yield 3-chloro-4-methoxy mandelic acid as white crystals, M.P. 134–137° C. Further recrystallization from water yields material having a melting point of 136.5–137° C.

A mixture of 21.6 g. of 3-chloro-4-methoxy mandelic acid (21.6 g.) and 28.8 g. of β-naphthol is heated at 170° for 30 minutes and then at 200° for 15 minutes. The cooled mass is warmed with 25 ml. of ethanol and the crystals which separate out are collected and washed with a little chilled ethanol. Recrystallization from carbon tetrachloride affords 1 - (3-chloro-4-methoxyphenyl)-2-oxo-1,2-dihydronaphtho[2,1-b]furan as white crystals, M.P. 168–170° C.

A solution of 15.0 g. of 1-(3-chloro-4-methoxyphenyl)-2-oxo-1,2-dihydronaphtho[2,1-b]furan in 170 ml. of acetic acid and 48 ml. of 48% aqueous hydrogen bromide is refluxed for 18 hours. Upon cooling, the reaction mixture deposits white crystals which are collected and recrystallized from benzene to yield 1-(3-chloro-4-hydroxyphenyl)-2-oxo-1,2 - dihydronaphtho[2,1-b]furan, M.P. 171–173° C.

A solution of 12.0 g. of 1-(3-chloro-4-hydroxyphenyl)-2-oxo-1,2-dihydronaphtho[2,1-b]furan in 120 ml. of isopropyl amine is refluxed for 2.5 hours. The excess amine is removed by distillation and a solution of the residue in ether is washed with aqueous hydrochloric acid and then with water. The ethereal solution is dried over magnesium sulfate and concentrated under reduced pressure and the residual solid is recrystallized from benzene to yield N-isopropyl 2-(3-chloro-4-hydroxyphenyl)-2-(2-hydroxy-1-naphthyl)acetamide as off-white crystals, M.P. 172° C.

EXAMPLE 6

N-isopropyl-2-(3-chloro-4-methoxyphenyl)-2-(2-hydroxy-1-naphthyl)acetamide

A solution of 15.2 g. of 1-(3-chloro-4-methoxyphenyl)-2-oxo-1,2-dihydronaphtho[2,1-b]furan in 53 ml. of isopropyl amine is refluxed for 2.5 hours and the excess amine is then removed by distillation. A solution of the residue in ethyl acetate is washed with half-saturated aqueous ammonium chloride solution, dried over sodium sulfate and concentrated under reduced pressure to yield N-isopropyl 2-(3-chloro-4-methoxyphenyl)-2-(2-hydroxy-1-naphthyl)acetamide as tan crystals.

EXAMPLE 7

N-t-butyl 2-(4-hydroxyphenyl)-2-(2-hydroxy-1-naphthyl)acetamide

A mixture of 12.3 g. of 1-(4-hydroxyphenyl)-2-oxo-1,2-dihydronaphtho[2,1-b]furan and 120 ml. of tert.-butylamine is refluxed for 17 hours and then stripped of excess amine by distillation. The residue is recrystallized from benzene to give N-tert.-butyl 2-(2-hydroxy-1-naphthyl)-2-(4-hydroxyphenyl)acetamide as tan crystals, M.P. 178.5° C. (dec.).

EXAMPLE 8

N-sec.-butyl 2-(2-hydroxy-1-naphthyl)-2-4-hydroxyphenyl)acetamide

A mixture of 10 g. of 1-(4-hydroxyphenyl)-2-oxo-1,2-dihydronaphtho[2,1-b]furan and 63 ml. of sec.-butylamine is refluxed for five hours. The excess amine is removed by distillation and the residue dried in vacuo to yield N-sec.-butyl-2-(2-hydroxy-1-naphthyl) - 2 - (4-hydroxyphenyl)acetamide, M.P. 69–108° C. (dec.).

EXAMPLE 9

N-t-butyl 2-(2-hydroxy-1-naphthyl)-2-phenylacetamide

A mixture of 15 g. of 1-phenyl - 2 - oxo - 1,2 - dihydronaphtho[2,1-b]furan (prepared as described by Bistrzycki and Flatan, Ber., 30, 124) and 100 ml. of tert.-butylamine is refluxed for 18 hours. The resulting solution is concentrated under reduced pressure and the solid recrystallized from benzene to yield N-tert.-butyl 2-(2-hydroxy-1-naphthyl)-2-phenylacetamide, M.P. 190° (dec.).

EXAMPLE 10

N-isobutyl 2-(4-hydroxyphenyl)-2(2-hydroxy-1-naphthyl)acetamide

A mixture of 1-(4-hydroxyphenyl)-2-oxo-1,2-dihydronaphtho[2,1-b]furan (15.0 g.) and isobutylamine (100 ml.) are refluxed for 4 hours and then distilled to remove excess solvent. The residue is warmed with benzene and the white crystalline N-isobutyl 2-(2-hydroxy-1-naphthyl)-2-(4-hydroxyphenyl)acetamide which separates from the benzene is collected; M.P. 154–159° C.

EXAMPLE 11

N-t-butyl 2-(4-fluorophenyl)-2-(2-hydroxy-1-naphthyl) acetamide

A mixture of p-fluoromandelic acid (20.0 g.) and β-naphthol (34 g.) is heated at 210° C. for two hours. The cooled mass is taken up in 20 ml. of hot ethanol and allowed to stand at room temperature overnight. The separated solid is collected and washed with a little ethanol giving white crystals which are recrystallized from heptane to yield 1-(4-fluorophenyl)-2-oxo-1,2-dihydronaphtho[2,1-b]furan as long white needles, M.P. 129–130° C.

A mixture of 1-(4-fluorophenyl)-2-oxo - 1,2 - dihydronaphtho[2,1-b]furan (12.5 g.) and tert.-butylamine (120 ml.) is refluxed for six hours. The excess amine is removed by distillation and the residue is recrystallized from benzene/petroleum ether to yield N - tert. - butyl 2 - (4-fluorophenyl)-2-(2-hydroxy-1-naphthyl)acetamide as tan crystals, M.P. 147° C. (dec.).

EXAMPLE 12

N-isopropyl (2-hydroxy-6-bromo-1-naphthyl)-2-(4-hydroxyphenyl) acetamide

A mixture of 6-bromo-2-naphthol (51.2 g.) and p-methoxy mandelic acid (20.6 g.) is heated at 180° for 25 minutes and then at 200° for 10 minutes. Ethanol (50 ml.) is added to the cooled mixture and the insoluble material is collected to yield 7-bromo-1-(4-methoxyphenyl)-2-oxo-1,2-dihydronaphtho[2,1-b]furan as a tan powder, M.P. 173.5–176.5° C.

A mixture of 36.9 g. of 7-bromo-1-(4-methoxyphenyl)-2-oxo-1,2-dihydronaphtho[2,1-b]furan, 355 ml. of acetic acid and 121 ml. of 48% aqueous hydrogen bromide is refluxed for 4 hours. The product which separates from the cooled reaction mixture is collected and washed well with aqueous ethanol. Several recrystallizations from aqueous acetic acid yields 7-bromo-1-(4-hydroxyphenyl)-2-oxo-1,2-dihydronaphtho[2,1-b]furan as light yellow crystals, M.P. 230–234° C. A mixture of 7.8 g. of this compound and 70 ml. of isopropyl amine is refluxed for 5 hours. Excess amine is distilled from the reaction mixture and the residue is rinsed with cold benzene to give N-isopropyl 2 - (6-bromo-2-hydroxy-1-naphthyl)-2-(4-hydroxyphenyl) acetamide as tan powder, M.P. 219–221° C. (dec.).

EXAMPLE 13

N-t-butyl (2,7-dihydroxy-1-naphthyl)-2-(4-hydroxyphenyl)acetamide

A mixture of 2,7-dihydroxynaphthalene (19.9 g.) and p-methoxy mandelic acid (11.1 g.) is heated at 180° for 1.5 hours. The cooled mass is treated with hot ethanol and the insoluble material is collected and recrystallized from aqueous acetic acid to yield 8-hydroxyl-1-(4-methoxyphenyl)-2-oxo-1,2 - dihydronaphtho[2,1-b]furan as pale green crystals, M.P. 211–212° C.

A mixture of 9.4 g. of 8-hydroxy-1-(4-methoxyphenyl)-2-oxo-1,2-dihydronaphtho[2,1-b]furan, 100 ml. o facetic acid, and 36 ml. of 48% aqueous hydrogen bromide is refluxed for 4.5 hours. The product which crystallizes from the cooled reaction mixture is collected and recrystallized from aqueous acetic acid to yield 8-hydroxy-1-(4 - hydroxyphenyl) - 2-oxo - 1,2-dihydronaphtho[2,1-b]furan as pale yellow crystals, M.P. 245–247° C. (dec.).

A mixture of 4.6 g. of 8-hydroxy-1-(4-hydroxyphenyl)-2-oxo-1,2-dihydronaphtho[2,1-b]furan and 43 ml. of tert.-butylamine is refluxed for 4.5 hours. After removal of the excess amine by distillation, N-tert.-butyl 2-(2,7-dihydroxy-1-naphthyl)-2-(4-hydroxyphenyl)acetamide is obtained as grey crystals, M.P. 102° C. (dec.).

EXAMPLE 14

N-isopropyl 2-(2,8-dihydroxy-1-naphthyl)-2-phenylacetamide

A mixture of 1,7-dihydroxynaphthalene (52 g.) and mandelic acid (30.4 g.) is heated at 210° C. for 3.5 hours, cooled and treated with 50 ml. of hot ethanol. The crystals which separate from the solution, after being allowed to cool overnight, are collected and washed with a little chilled ethanol. Recrystallization from aqueous acetic acid yields 9-hydroxy-1-phenyl-2-oxo-1,2-dihydronaphtho[2,1-b]furan as a grey powder, M.P. 223.5–228° C.

A mixture of 9-hydroxy-1-phenyl-2-oxo-1,2-dihydronaphtho[2,1-b]furan (11.9 g.) and isopropyl amine (100 ml.) are refluxed for 3 hours. Excess amine is removed by distillation to yield N-isopropyl 2-(2,8-dihydroxy-1-naphthyl)-2-phenylacetamide as a dark powder, M.P. 80–90° C. (dec.).

EXAMPLE 15

N-p-hydroxypheneth-2′-yl 2-(4-hydroxyphenyl)-2-(2-hydroxy-1-naphthyl)acetamide

A mixture of 7.8 g. of 1-(4-hydroxyphenyl)-2-oxo-1,2-dihydronaphtho[2,1-b]furan and 4.0 g. of tyramine in 100 ml. of ethanol is refluxed for 18 hours. Excess ethanol is then removed by distillation and the residue is suspended in boiling benzene. Sufficient ethanol is added to effect solution, and the solution is filtered and diluted with benzene to the cloud-point. After standing overnight, the solution deposits N-p-hydroxypheneth-2′-yl 2-(4-hydroxyphenyl)-2-(2-hydroxy-1-naphthyl)acetamide as tan crystals, M.P. 155–160° C.

EXAMPLE 16

N,N-diethyl 2-(2-hydroxy-1-naphthyl)-2-(4-hydroxyphenyl)acetamide

A mixture of 15 g. of 1-(4-hydroxyphenyl-2-oxo-1,2-dihydronaphtho[2,1-b]furan and 95 ml. of diethyl amine is refluxed for 17 hours. The solid which separates upon cooling is collected and washed with ether to yield N,N-diethyl 2-(2-hydroxy-1-naphthyl)-2 - (4-hydroxyphenyl)-acetamide as a white powder, M.P. 134° C. (dec.).

EXAMPLE 17

N-t-butyl 2-(2,3-dihydroxy-1-naphthyl)-2-(4-hydroxyphenyl)acetamide

A mixture of 2,3-dihydroxynaphthalene (19.9 g.) and p-methoxy mandelic acid (11.3 g.) is heated at 180° for 1.5 hours. Twenty-eight milliliters of ethanol are added to the cooled mass with good stirring and the insoluble material is collected and recrystallized from acetic acid to give 4-hydroxy-1-(4-methoxyphenyl)-2-oxo-1,2-dihydonaphtho[2,1 - b]furan as tan crystals, M.P. 205–207.5° C.

A mixture of 9 g. of 4-hydroxy-1-(4-methoxyphenyl)-2-oxo-1,2-dihydronaphtho[2,1-b]furan, 95 ml. of acetic acid and 34 ml. of 48% aqueous hydrogen bromide is refluxed for 4.5 hours. Upon cooling to 0°, the reaction mixture deposits red-orange crystals; dilution of the mother liquors with water affords additional material. The combined crops are recrystallized from aqueous acetic acid to yield 4-hydroxy-1-(4-hydroxyphenyl)-2-oxo-1,2-dihydronaphtho[2,1-b]furan as light tan crystals, M.P. 247–254° C.

A mixture of 4.4 g. of 4-hydroxy-1-(4-hydroxyphenyl)-2-oxo-1,2-dihydronaphtho[2,1-b]furan in 40 ml. of tert.-butyl amine is refluxed for 23 hours. The excess amine is removed by distillation to yield N-tert.-butyl 2-(2,3-dihydroxy-1-naphthyl)-2-(4-hydroxyphenyl)acetamide as dark crystals, M.P. 94–97° C. (dec).

EXAMPLE 18

N-ethyl (2-hydroxy-1-naphthyl)-2-(4-hydroxyphenyl)acetamide

By substituting ethylamine for isopropylamine in the procedure of Example 1 and thereafter executing the procedures therein described, there is obtained N-ethyl 2-(2-hydroxy-1-naphthyl)-2-(4 - hydroxyphenyl)acetamide, M.P. 182° C. (dec.).

In a like fashion, using n-propylamine, there is obtained N-(n-propyl) 2-(2-hydroxy - 1 - naphthyl)-2-(4-hydroxyphenyl)acetamide, M.P. 156° C. (dec.).

EXAMPLE 19

2-(2-hydroxy-1-naphthyl-2-(4-hydroxyphenyl)acetamide

A mixture of 5 g. of 1-(4-hydroxyphenyl)-2-oxo-1,2-dihydronaphtho[2,1-b]furan and 100 ml. of ethanol saturated with ammonia is heated at reflux with a Dry Ice condenser for 5 hours. The mixture is then evaporated to remove the solvent and remaining ammonia and the residue is dissolved in ethyl ether. This solution is washed with dilute hydrochloric acid and water, dried over magnesium sulfate and evaporated to yield 2-(2-hydroxy-1-naphthyl)-2-(4-hydroxyphenyl)acetamide which may be further purified through recrystallization from benzene/petroleum ether.

EXAMPLE 20

N-tert.-butyl-2-(2-methoxy-1-naphthyl)2-phenylacetamide

A mixture of 7.2 g. of 1-phenyl-2-oxo-1,2-dihydronaphtho[2,1-b]furan and 120 ml. of 1 N aqueous sodium hydroxide is heated at 100° C. for 30 minutes, at which time a solution is achieved. Eighteen milliliters of dimethylsulfate and 200 ml. of 1 N aqueous sodium hydroxide are then alternately added over a 45 minute period. This mixture is heated at reflux until a complete solution is again obtained and this solution is cooled, filtered and rendered acid with hydrochloric acid. The solid which forms is collected by filtration and dried over phosphorous pentoxide to yield 2-(2-methoxy-1-naphthyl)-2-phenylacetic acid, M.P. 98° C. A solution of 5.2 g. of this acid in 125 ml. of benzene is treated with 5 ml. of thionyl chloride. This mixture is allowed to stand at about 25° C. for 30 minutes and is then heated at reflux temperatures for 2 hours. Concentration under reduced pressure yields a tan solid which is dissolved in 100 ml. of ether and treated with 10 ml. of tert.-butylamine. This mixture is allowed to stand at about 25° C. for 30 minutes and is then heated at reflux temperature for 10 minutes. After filtration and concentration of the reaction mixture, the residue is distilled four times at 165° C./10$^{-3}$ mm. to yield N-tert.-butyl 2-(2-methoxy-1-naphthyl)-2-phenylacetamide as an amber glass.

EXAMPLE 21

A solution of 51.4 g. N-isopropyl 2-(2-hydroxy-1-naphthyl)-2-(4 - hydroxyphenyl)acetamide, prepared in accordance with Example 1, in 500 ml. of tetrahydrofuran is added dropwise to 462 ml. of a 1 M solution of borane in tetrahydrofuran maintained at 0° under nitrogen. After addition is complete, the reaction mixture is refluxed for 4 hours, the cooled reaction mixture is rendered acidic by careful addition of 1800 ml. of 3 N aqueous hydrochloric acid and the tetrahydrofuran is removed by distillation. The solid which separates from the aqueous phase is collected and recrystallized from ethanol/ether to yield N-2-(4-hydroxyphenyl)-2-(2-hydroxy-1-naphthyl)ethyl-N-isopropyl-amine hydrochloride, M.P. 246° C. (dec.). Treatment with aqueous sodium hydroxide yields the free base, M.P. 162.5° C.

Alternatively, a solution of 5.4 g. of N-isopropyl 2-(2-hydroxy-1-naphthyl)-2-(4 - hydroxyphenyl)acetamide in 50 ml. of tetrahydrofuran is added dropwise over a 45 minute period to a suspension of 2.0 g. of lithium aluminum hydride in 100 ml. of tetrahydrofuran maintained at room temperature. After the addition, and an additional one hour at ambient temperature, the reaction mixture is heated at reflux for 2.5 hours. Ethanol (15 ml.) is added cautiously to the cooled reaction mixture, followed by 170 ml. of 3 N hydrochloric acid. The organic solvents are removed by distillation and the sticky tan solid which separates from the aqueous phase is collected and dried by azeotropic distillation with ethanol/benzene. The dried solid is extracted with ether and the ether insoluble material is recrystallized from ethanol/ether to give the product as the hydrochloride, identical with that prepared in accordance with the initial procedure of this example.

The following compounds are similarly prepared from the corresponding acetamides of this invention via the above procedures:

N-2-(4-chlorophenyl)-2-(2-hydroxy-1-naphthyl)ethyl-N-isopropylamine HCl, M.P. 220° C. (dec.).

N-2-(3,4-dichlorophenyl)-2-(2-hydroxy-1-naphthyl)-ethyl-N-isopropylamine HCl, M.P. 210° C. (dec.).

N-2-(4-methoxyphenyl)-2-(2-hydroxy-1-naphthyl)-ethyl-N-isopropylamine HCl, M.P. 236° (dec.).

N-2-(3-chloro-4-hydroxyphenyl)-2-(2-hydroxy-1-naphthyl)ethyl-N-isopropylamine HCl, M.P. 258° C. (dec.).

N-2-(3-chloro-4-methoxyphenyl)-2-(2-hydroxy-1-naphthyl)ethyl-N-isopropylamine HCl, M.P. 254.5° C. (dec.).

N-2-(4-hydroxyphenyl)-2-(2-hydroxy-1-naphthyl)-ethyl-N-t-butylamine HCl, M.P. 229° C. (dec.).

N-2-(4-hydroxyphenyl)-2-(2-hydroxy-1-naphthyl)-ethyl-N-sec-butylamine HCl, M.P. 229° C. (dec.).

N-2-phenyl-2-(2-hydroxy-1-naphthyl)ethyl-N-t-butylamine HCl, M.P. 250° C. (dec.).

N-2-(4-hydroxyphenyl)-2-(2-hydroxy-1-naphthyl)-ethyl-N-isobutylamine HCl, M.P. 217° C. (dec.).

N-2-(4-fluorophenyl)-2-(2-hydroxy-1-naphthyl)ethyl-N-t-butylamine HCl, M.P. 256° C. (dec.).

N-2-(4-hydroxyphenyl)-2-(2-hydroxy-6-bromo-1-naphthyl)ethyl-N-isopropylamine HCl, M.P. 244.5° C. (dec.).

N-2-(4-hydroxyphenyl)-2-(2,7-dihydroxy-1-naphthyl)-ethyl-N-t-butylamine HCl, M.P. 199.5° C. (dec.).

N-2-phenyl-2-(2,8-dihydroxy-1-naphthyl)ethyl-N-isopropylamine HCl, M.P. 238° C. (dec.).

N-2-(4-hydroxyphenyl)-2-(2-hydroxy-1-naphthyl)-ethyl-N-[2-(4-hydroxyphenyl)ethyl]amine HCl, M.P. 242° C. (dec.).

N-2-(4-hydroxyphenyl)-2-(2-hydroxy-1-naphthyl)-ethyl-N,N-diethylamine, M.P. 198° C. (dec.); HCl (monoethanolate), M.P. 165–170° C. (dec.).

N-2-(4-hydroxyphenyl)-2-(2,3-dihydroxy-1-naphthyl)-ethyl-N-t-butylamine HCl, M.P. 198° C. (dec.).

N-2-(4-hydroxyphenyl)-2-(2-hydroxy-1-naphthyl)-ethyl-N-ethylamine HCl, M.P. 237° C. (dec.).

N-2-(4-hydroxyphenyl)-2-(2-hydroxy-1-naphthyl)-ethyl-N-propylamine HCl, M.P. 224° C. (dec.).

2-(4-hydroxyphenyl)-2-(2-hydroxy-1-naphthyl)ethyl-amine HCl, M.P. 210° C. (dec.).

In a similar fashion, N-tert.-butyl-N-2-(2-methoxy-1-naphthyl)-2-phenethylamine, M.P. 228° C. (dec.) as the hydrochloride, an antiarrhythmic and cardiovascular agent, is obtained via either of the above procedures from the corresponding acetamide.

EXAMPLE 22

| Ingredient: | Quantity/capsule, mg. |
|---|---|
| N-t-butyl N-2-(2-hydroxy-1-naphthyl)-2-phenylacetamide | 250 |
| Lactose | 150 |
| Magnesium stearate | 3 |

The foregoing ingredients are mixed and introduced into a two-piece No. 2 hard gelatin capsule.

EXAMPLE 23

| Ingredient: | Quantity/capsule, mg. |
|---|---|
| N-isopropyl 2 - (2 - hydroxy-1-naphthyl)-2-(4-hydroxyphenyl)acetamide | 500 |
| Lactose | 80 |
| Corn starch | 70 |
| Soluble starch | 15 |
| Magnesium stearate | 5 |

The first three ingredients are thoroughly mixed and granulated with a solution of the soluble starch. This granulate is dried, mixed with the magnesium stearate and pressed into tablet cores which are coated as with sugar.

What is claimed is:

1. A compound of the formula:

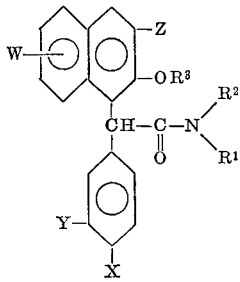

wherein
each of X and Y is hydrogen, hydroxy, methoxy, chloro or fluoro;
W is hydrogen, chloro, fluoro, bromo or hydroxy;
Z is hydrogen or hydroxy;
$R^1$ is hydrogen or (lower)alkyl;
$R^2$ is hydrogen, (lower)alkyl, phenyl(lower)alkyl or hydroxyphenyl(lower)alkyl; and
$R^3$ is hydrogen or (lower)alkyl.

2. A compound according to claim 1 wherein Y is hydrogen or chloro; W is hydrogen or hydroxy; Z is hydrogen, $R^2$ is hydrogen or (lower)alkyl, and $R^3$ is hydrogen.

3. A compound according to claim 1 wherein each of Y, W, Z and $R^3$ is hydrogen and $R^2$ is hydrogen or (lower)alkyl.

4. The compound according to claim 1 wherein the compound is N-isopropyl 2-(2-hydroxy-1-naphthyl)-2-(4-hydroxyphenyl)acetamide.

5. The compound according to claim 1 wherein the compound is N-isopropyl 2 - (4-chlorophenyl)-2-(2-hydroxy-1-naphthyl)acetamide.

6. The compound according to claim 1 wherein the compound is N-isopropyl 2-(3,4-dichlorophenyl)-2-(2-hydroxy-1-naphthyl)acetamide.

7. The compound according to claim 1 wherein the compound is N-isopropyl (2-hydroxy-1-naphthyl)-2-(4-methoxyphenyl)acetamide.

8. The compound according to claim 1 wherein the compound is N-isopropyl 2-(3-chloro-4-hydroxyphenyl)-2-(2-hydroxy-1-naphthyl)acetamide.

9. The compound according to claim 1 wherein the compound is N-isopropyl 2-(3-chloro-4-methoxyphenyl)-2-(2-hydroxy-1-naphthyl)acetamide.

10. The compound according to claim 1 wherein the compound is N-t-butyl 2 - (4-hydroxyphenyl)-2-(2-hydroxy-1-naphthyl)acetamide.

11. The compound according to claim 1 wherein the compound is N-sec.-butyl 2-(2-hydroxy-1-naphthyl)-2-(4-hydroxyphenyl)acetamide.

12. The compound according to claim 1 wherein the compound is N-t-butyl 2 - (2 - hydroxy-1-naphthyl)-2-phenylacetamide.

13. The compound according to claim 1 wherein the compound is N-isobutyl 2 - (4-hydroxyphenyl)-2-(2-hydroxy-1-naphthyl)acetamide.

14. The compound according to claim 1 wherein the compound is N-t-butyl 2-(4-fluorophenyl)-2-(2-hydroxy-1-naphthyl)acetamide.

15. The compound according to claim 1 wherein the compound is N-isopropyl (2 - hydroxy-6-bromo-1-naphthyl)-2-(4-hydroxyphenyl)acetamide.

16. The compound according to claim 1 wherein the compound is N-t-butyl (2,7-dihydroxy-1-naphthyl)-2-(4-hydroxyphenyl)acetamide.

17. The compound according to claim 1 wherein the compound is N-isopropyl 2-(2,8-dihydroxy-1-naphthyl)-2-phenylacetamide.

18. The compound according to claim 1 wherein the compound is N-p-hydroxypheneth - 2' - yl 2-(4-hydroxyphenyl)-2-(2-hydroxy-1-naphthyl)acetamide.

19. The compound according to claim 1 wherein the compound is N,N-diethyl 2-(2-hydroxy-1-naphthyl)-2-(4-hydroxyphenyl)acetamide.

20. The compound according to claim 1 wherein the compound is N-t-butyl 2-(2,3-dihydroxy-1-naphthyl)-2-(4-hydroxyphenyl)acetamide.

21. The compound according to claim 1 wherein the compound is N-ethyl (2 - hydroxy-1-naphthyl)-2-(4-hydroxyphenyl)acetamide.

22. The compound according to claim 1 wherein the compound is 2 - (2-hydroxy-1-naphthyl)-2-(4-hydroxyphenyl)acetamide.

23. The compound according to claim 1 wherein the compound is N-tert.-butyl-2-(2 - methoxy-1-naphthyl)-2-phenylacetamide.

24. The compound according to claim 1 wherein the compound is N-(n-propyl) 2-(2-hydroxy-1-naphthyl)-2-(4-hydroxyphenyl)acetamide.

References Cited

UNITED STATES PATENTS

| 3,426,027 | 2/1969 | Muller et al. | 260—559 |
| 3,025,323 | 3/1962 | Rose et al. | 260—561 |
| 2,692,895 | 10/1954 | Opfermann | 260—561 |

HENRY R. JILES, Primary Examiner

H. I. MOATZ, Assistant Examiner

U.S. Cl. X.R.

260—570.8, 346.2; 424—324, 330